Patented May 11, 1943

2,318,742

UNITED STATES PATENT OFFICE 2,318,742

PURIFICATION OF PARTIALLY OXIDIZED STYRENE BY TREATING WITH SODIUM BISULPHITE

Edgar C. Britton and Walter J. Le Fevre, Midland, Mich., assignors to The Dow Chemical Company, Midland, Mich., a corporation of Michigan No Drawing. Application August 31, 1938, Serial No. 227,846

1 Claim. (Cl. 260—669)

This invention concerns an improved method of manufacturing and working polystyrene-like resins to obtain the same in exceptionally clear, colorless, transparent forms having good mechanical properties.

By a "polystyrene-like" resin is meant a solid, synthetic, thermoplastic resin prepared by polymerizing a vinyl-aromatic compound alone or together with another unsaturated compound which will react therewith during the polymerization to form a resinous co-polymer. Plasticizing agents may also be present. Examples of vinyl-aromatic compounds which may be used in preparing the styrene-like resins are styrene, para-methyl-styrene, meta-ethyl-styrene, para-chloro-styrene, divinyl benzene, vinyl naphthalene, etc. Examples of polystyrene-like co-polymers are the known co-polymers of styrene with divinyl benzene and with divinyl maleate, etc. The term "working" a polystyrene-like resin refers to mechanical operations such as grinding, pulverizing, rolling, and extruding, which are usual in the handling of thermoplastic resins.

Essentially, the invention resides in our discovery that a polystyrene-like resin prepared in the absence of solvents or air or oxygen is more clear, colorless, transparent and resistant to discoloration or blushing on standing and is considerably tougher, more ductile and of higher molecular weight than is a corresponding resin prepared under like conditions, except that it or the material from which it is prepared is contacted with air or oxygen at some stage prior to completion of the polymerization. The invention comprises a number of other important discoveries pertaining to procedure for handling the resin during its preparation or during subsequent working of the same. For instance, we have found that styrene, which is known to be an excellent absorbent for oxygen and to be oxidized by the latter with formation of aldehydes, organic peroxides, etc., may be freed of oxygen and objectionable oxidation products by treating the same with an agent which is capable of combining chemically with oxygen and aldehydes and separating the reaction products from the styrene. We have also found that the usual tendency toward local over-heating due to heat generated by the polymerization may be avoided and a product of unusual uniformity, clarity, strength and toughness may be obtained by stirring the mass during polymerization in an inert atmosphere so as to obtain substantially even distribution of heat throughout the mass and a more effective heat balance between the usual heating means and the body of polymerizable material than is obtainable by merely heating a static or sluggishly-flowing body of such material. We have further observed that the polystyrene-like resin, which usually contains a small proportion of unpolymerized material, undergoes discoloration if vigorously worked in contact with air or oxygen, but that such discoloration may be prevented by working the resin in an atmosphere of nitrogen or other inert gas out of contact with air.

We are aware that the single operation of polymerizing styrene out of contact with air is old, and that it is known that polystyrene so prepared is of higher molecular weight than is polystyrene prepared under like conditions except in contact with air. However, this single operation will not produce the clear, colorless resins of exceptional luster which are obtainable by the present invention. As hereinbefore pointed out, the present invention requires that styrene first be rendered substantially free of oxygen and aldehydes and thereafter be handled out of contact with air until polymerized to the desired solid resin. We have observed that if the styrene be contacted with air either prior to or during the polymerization, a polymer of yellowish tinge is obtained and that this undesirable coloration is more intense when styrene which has been contacted with air is polymerized in an inert atmosphere than when such styrene is polymerized in contact with air. For instance, styrene which was distilled under vacuum at 50 millimeters pressure with introduction through a capillary tube of only sufficient air to prevent bumping, when stored and polymerized in an atmosphere of nitrogen yielded a polymer of distinctly yellow tinge, whereas a separate sample of the same styrene when polymerized in contact with air yielded a relatively colorless resin which, however, lacked the clarity, brilliance and toughness of the resinous polymers obtainable according to the invention. We are also aware that a solution of styrene in ethyl-benzene has been steam distilled and polymerized in an atmosphere of hydrogen, but such operations do not yield the clear, tough polymers obtainable according to the present invention, since the presence of a solvent, as is well known, retards polymerization and causes a pronounced reduction in molecular weight of the polymer, thereby preventing formation of resins as tough and strong as are obtainable in the absence of solvents. The advantages of this invention are obtained only by first rendering styrene or a similar material practically free of oxygen and aldehydes and thereafter polymerizing the material in the substantial absence of solvents and out of contact with air or oxygen. By "substantial absence of solvents" we mean that the material undergoing polymerization shall not contain an inert diluent in a proportion sufficient to affect materially the rate, extent, or course of the polymerization. The presence of up to 10 per cent by weight of inert substances in the material undergoing polymerization is permissible.

In practicing the invention, styrene or other vinyl-aromatic compound is rendered free of oxygen and objectionable oxidation products, e. g. aldehydes, either by treating the same with an agent which will combine chemically with oxygen and aldehydes to form compounds readily separable from the vinyl-aromatic compound, or by distilling the vinyl-aromatic compound in an inert atmosphere, or by both such operations. When the vinyl-aromatic compound is freshly prepared material which has been exposed to air for only a short time, e. g. one hour, it may be repurified satisfactorily by either of the operations just mentioned. When the vinyl-aromatic compound is material which has been exposed to air for several hours or more, e. g. for a period sufficient so that it will not only have absorbed oxygen but also will have undergone appreciable oxidation, it should be treated with the agent capable of combining chemically with oxygen and aldehydes and it may thereafter advantageously be distilled in an inert atmosphere. Among the various agents capable of combining chemically with oxygen and aldehydes which may be used are aqueous solutions of sodium bisulphite and solutions of phenyl-hydrazine in weak aqueous acids, e. g. dilute aqueous acetic acid. The vinyl-aromatic compound is agitated with such solution and thereafter is either filtered, dried and stored in an inert atmosphere, or is distilled in such atmosphere. The distillation is preferably carried out under vacuum as usual, except that nitrogen or other inert gas is admitted in amount sufficient to sweep air from the distilling equipment.

The oxygen-free polymerizable material is preferably stored under an inert atmosphere until ready for polymerization, since even short contact with air, e. g. for one hour or longer, results in discoloration of the final resinous product.

The polymerization is carried out in the absence of solvents and in contact with an atmosphere of nitrogen or other inert gas. It may be effected at any temperature between room temperature and about 250° C., but in order to obtain a satisfactory rate of polymerization and at the same time obtain a tough, strong resin, it is preferably carried out at temperatures between 90° and 170° C. and with continual mixing of the material during polymerization. If desired, a polymerization catalyst, such as an organic peroxide, may be present in small proportion, e. g. 0.01–3.0 per cent by weight, to promote the polymerization, but such catalyst tends to lower the molecular weight of the polymer and usually is not employed. Strangely enough, organic peroxides do not cause discoloration in the polymer such as is brought about by contacting the polymerizable material with air or oxygen.

The polymerization may be continued to obtain a resin solid at room temperature which contains only from 0.5 to 5.0 per cent of unpolymerized material, but when operating in the absence of a catalyst, the time required for such complete polymerization is unduly long, e. g. two days or longer depending on the polymerizing temperature. In practice, we find it more convenient to partially polymerize the material, e. g. until it contains from 30 to 90 per cent of polymer, and then to distill unpolymerized material from the resin at sub-atmospheric pressure while contacting both the resin and the distillate with an inert gas. This distillation may be carried out in an ordinary still or from the polymerizing chamber, but it preferably is carried out by spreading the partially polymerized material on the trays of a vacuum oven and thereafter evacuating and warming; the material, of course, being at all times protected from air. By operating in this manner, the removal of unpolymerized material takes place rapidly, due to the large surfaces from which evaporation may occur, and the residual resin is obtained in the form of sheets or slabs which are readily broken and ground to molding powders.

The unpolymerized material recovered in the distillation may be polymerized as hereinbefore described to obtain additional resin. The residual resinous product is cooled, e. g. to room-temperature or thereabout, before being removed from the inert atmosphere and contacted with air. It is a clear, brilliant, colorless, transparent resin of unusual toughness and, at ordinary temperatures, is resistant to attack by air. However, if heated or worked in contact with air, it may suffer attack with resultant development of a yellow tinge.

Accordingly, when the polystyrene-like resin is to be worked, e. g. pulverized or ground to a molding powder, or rolled or milled at elevated temperatures to incorporate plasticizers, dyes, pigments, molding lubricants, fillers, etc. therewith, such working is carried out in an inert atmosphere with exclusion of air. Apparently contact of the cold polymer with air for a few hours prior to such working is not detrimental, but in practice, when the resin is to be worked, we prefer that it be protected from air at all times until the working operation is completed.

The following examples describe a number of ways in which the principle of the invention has been applied, but are not to be construed as limiting the invention.

EXAMPLE 1

The purpose of this example is to demonstrate the advantages of preparing a polystyrene-like resin in accordance with the invention, rather than in other ways. Polystyrene was prepared under five different sets of conditions differing, as regards the operating conditions, only slightly from one experiment to the next. However, only the last of these five experiments was in accordance with the invention.

*Experiment (a)*

Styrene was distilled at 50 millimeters absolute pressure with admittance through a capillary tube of sufficient air to prevent bumping. The distillate was heated at 110° C. with its upper surface exposed to air as usual until the material was 98.2 per cent polymerized. The product was a nearly colorless, transparent resin of good appearance. When viewed alone it appeared clear and colorless, but when compared with the product in Experiment e of this example it appeared slightly hazy and was seen to have a yellowish tint. On standing for several weeks it developed the slight haze usual in polystyrene, whereas the product in Experiment e below remained clear and colorless on standing under like conditions over the same period.

Experiment (b)

Styrene was distilled as in Experiment a, but was thereafter heated at 110° C. under an atmosphere of nitrogen with exclusion of air until 96.6 per cent polymerized. The polymer was a distinctly yellowish resin inferior in appearance to that obtained in Experiment a.

Experiment (c)

Styrene was washed with an aqueous sodium bisulphite solution and then distilled as in Experiment a except that the distilling equipment was first swept free of air with nitrogen and during the distillation nitrogen instead of air was admitted through a capillary tube to prevent bumping and maintain an inert atmosphere over the styrene. The distilled styrene was then heated at 110° C. under exposure to air until 98.1 per cent polymerized. The resinous product possessed a deeper yellow color than either of the products obtained in Experiments a and b. Its appearance was poor.

Experiment (d)

Styrene was washed with an aqueous sodium bisulphite solution and then distilled in an atmosphere of nitrogen as in Experiment c. Without intermittent exposure to air, the styrene was heated in contact with nitrogen at a temperature of 120° C. until 77 per cent polymerized. At this point the material was a colorless, transparent resin. The material was further heated under exposure to air at a temperature of 110° C. until the polymerization was 95.5 per cent complete. The resultant resin was yellow and undesirable in appearance. It was of about the same shade as that obtained in Experiment c.

Experiment (e)

Styrene was washed with an aqueous sodium bisulphite solution and distilled under vacuum with nitrogen as in Experiment d. Without intermittent exposure to air, the styrene was heated at a temperature of 110° C. under exposure to nitrogen until 97.5 per cent polymerized. The resultant resin was clear, colorless and transparent. It possessed a luster and clarity exceeding by far that of the resins obtained in Experiments a–d. Furthermore, on standing at room temperature in the air for several weeks it did not lose its luster or become discolored.

EXAMPLE 2

Separate samples of styrene which had been freed of oxygen and aldehydes by washing with an aqueous sodium bisulphite solution and had thereafter been distilled and stored under nitrogen, were polymerized under three sets of conditions. Each polymerization was carried out in a mechanical mixing device externally heated to 100° C. with steam, and each polymerized mixture was dissolved in benzene and the solution poured into alcohol to precipitate the polymer in a form free of the monomer. Each precipitated polymer was dried and then analyzed to determine its molecular weight. The experiments differed from one-another in that the first polymerization was carried out under exposure to air and without agitation; the second was carried out under an atmosphere of nitrogen but also without stirring; and the third was carried out under an atmosphere of nitrogen but with vigorous stirring during the polymerization. The molecular weights of the three products were as follows:

| Exp. No. | Polymerizing conditions | | Molecular weight |
|---|---|---|---|
| | Atmosphere | Agitation | |
| 1 | Air | None | 36,500 |
| 2 | $N_2$ | None | 66,000 |
| 3 | $N_2$ | Yes | 79,000 |

EXAMPLE 3

The purpose of this example is to demonstrate that aldehydes, particularly benzaldehyde, such as are normally formed by exposing styrene to air tend to reduce the molecular weight of a resin formed by polymerizing the styrene at a given temperature and further to show that a resin of higher molecular weight may be produced by removing oxygen and aldehydes from styrene and polymerizing the latter in the absence of air or oxygen. Two sets of experiments were carried out. In the first set, styrene which had stood for several days in contact with air, another sample of the same styrene to which 1 per cent by weight of benzaldehyde was added, and a third sample of the same styrene to which 10 per cent of benzaldehyde was added, were each polymerized by heating at a temperature of 140° C. for 16.5 hours. Each resinous polymer was then dissolved in benzene and the polymer was precipitated in a form free of monomer by pouring the solution in alcohol. Each precipitated polymer was washed with alcohol, dried under vacuum and its molecular weight determined. The molecular weights were:

| Experiment No. | Substance polymerized | Molecular weight |
|---|---|---|
| 1 | Styrene | 50,000 |
| 2 | Styrene plus 1 per cent benzaldehyde | 43,000 |
| 3 | Styrene plus 10 per cent benzaldehyde | 40,000 |

In the second set of experiments, a sample of styrene which had been permitted to stand in air was polymerized by heating in contact with air at a temperature of 80° C. for 24 hours; and another sample of styrene which had been freed of dissolved oxygen and aldehydes by washing with an aqueous sodium bisulphite solution and then distilling under vacuum in a nitrogen atmosphere was polymerized by heating the same at a temperature of 80° C. for 24 hours in contact with nitrogen. Each resin was treated as above-described to separate the polymer from unpolymerized material and the molecular weight of each polymer was determined. The polymer from the styrene which prior to and during polymerization was contacted with air had the molecular weight 97,000, whereas the polymer from the styrene which had been freed of oxygen and aldehydes and had been polymerized under nitrogen had the molecular weight 131,000.

It will be understood that any gas or vapor inert toward vinyl-aromatic compounds and their polymers and only sparingly soluble in the same may be employed in the invention to protect the monomeric or polymerized vinyl-aromatic compound from contact with air. For instance, when an operation is to be carried out at room temperature and atmospheric pressure, an inert permanent gas, such as nitrogen, carbon dioxide, hydrogen, methane, ethane, propane, butane, etc., should be used as the protecting atmosphere and these same gases may also be employed at higher temperatures and either lower or higher pressures. However, certain other inert substances which are liquid at room temperature, e. g. pentane, hexane, water, etc., may be used to supply the inert vapor in operations which are carried out at temperatures above their boiling points.

Other modes of applying the principle of the invention may be employed instead of those explained, change being made as regards the method described, provided the step or steps stated by the following claim or the equivalent of such stated step or steps be employed.

We therefore particularly point out and distinctly claim as our invention:

The method which comprises treating styrene, which has been partially oxidized by exposure to air, with an aqueous sodium bisulphite solution, whereby the oxygen and organic oxidation products react with the sodium bisulphite to form compounds which are readily separable from the vinyl-aromatic compound and removing the products of this reaction to recover the vinyl-aromatic compound in purified condition.

EDGAR C. BRITTON.
WALTER J. LE FEVRE.